United States Patent Office 3,059,770
Patented Oct. 23, 1962

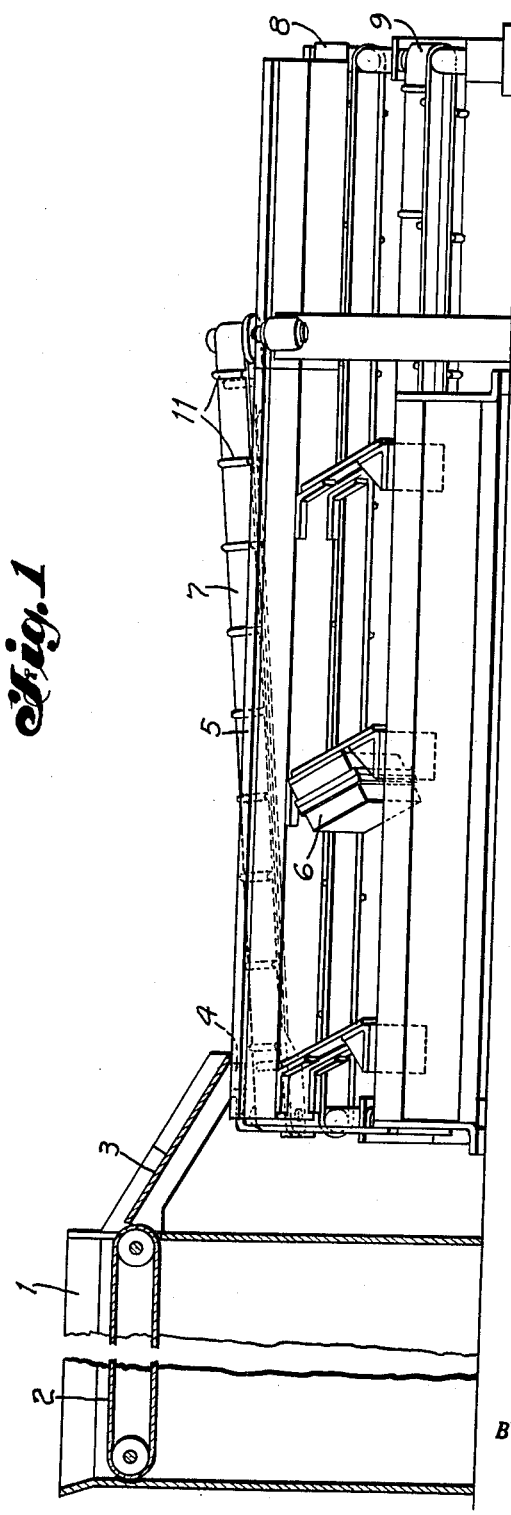

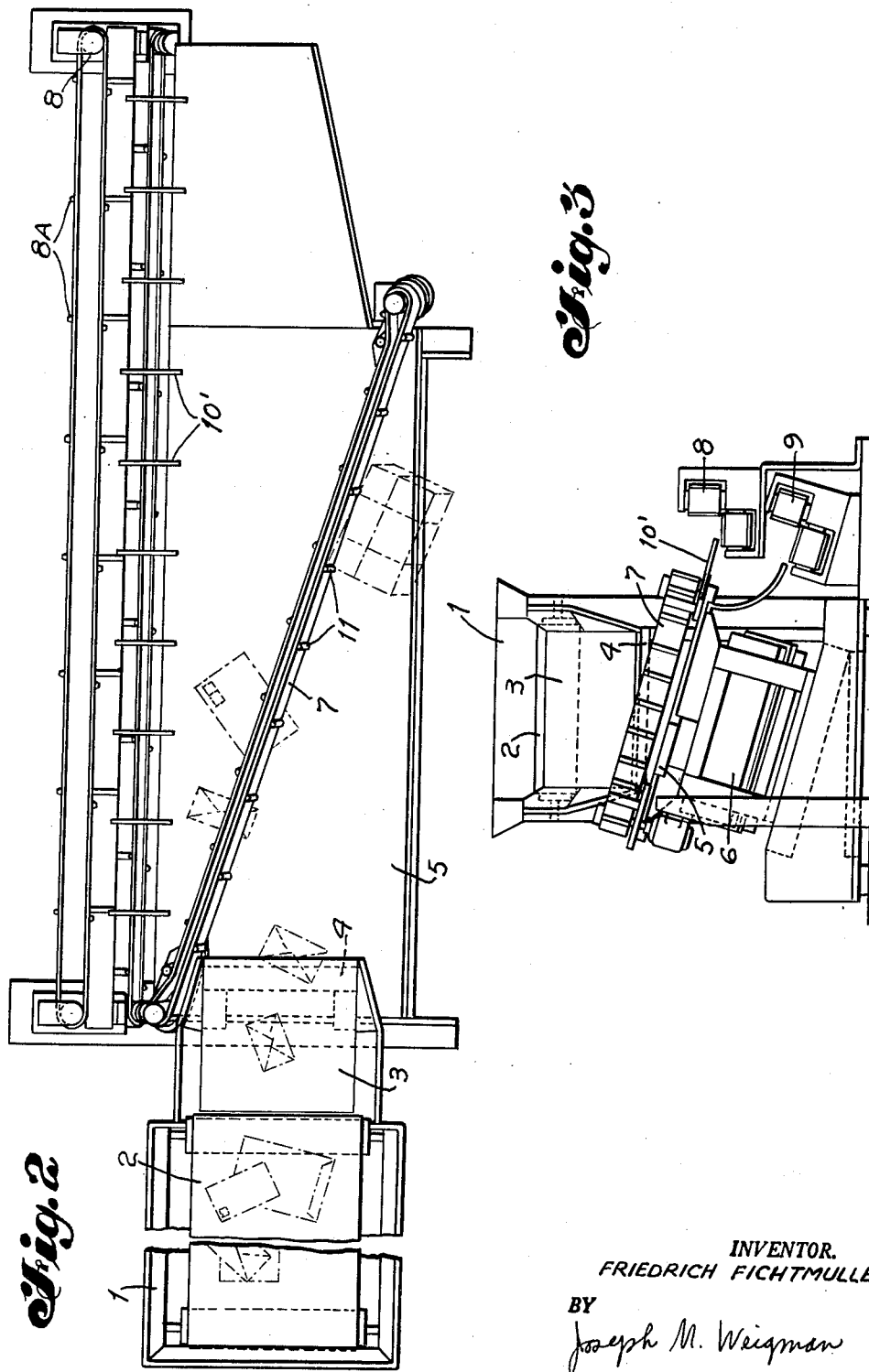

3,059,770
ARTICLE SORTING ARRANGEMENT
Friedrich Fichtmuller, Malsch, near Karlsruhe, Germany, assignor to International Standard Electric Corporation, New York, N.Y., a corporation of Delaware
Filed Nov. 12, 1958, Ser. No. 773,458
Claims priority, application Germany Nov. 11, 1957
5 Claims. (Cl. 209—91)

This invention relates to materials handling, and more particularly to sorting machines.

Arrangements are known which serve to sort mail articles and similar objects according to their dimensions and especially in the case of outgoing mail, serve to have standard sized letters and post cards sorted out in order that they may then be subjected to a further treatment, letters and post cards constituting the major portion of the mail. This treatment consists in positioning the articles for reading and in sorting them as to the destinations, and also deals with the cancelling of the stamps. Mail articles are different among themselves as to shape and size, being, for example, packages, boxes, letters and post cards.

In the arrangement according to Belgian Patent 558,940, for instance, articles are supplied to a main conveying path by which the articles are led onto side or branch paths predetermined by the sizes of the articles. To achieve this, the main path has lateral guides as well as guides provided in its bottom. The articles on the main path are moved along it by agitating means, for instance, acting on this path. At first, articles of certain thicknesses are guided onto the side paths. The other articles will then reach these in accordance with other dimensions.

The arrangement as described in said patent has the drawback that several agitating systems must be provided, so that the operation is somewhat noisy and lacks maximum efficiency. Hence, if the working capacity is to be great the plant must be relatively large and will have a corresponding high power requirement.

This invention is to avoid these shortcomings.

According to the invention the main conveying path is surmounted by a belt conveyor spaced therefrom to form a clearance for the passage thereunder of those articles to be sorted out which are of the permissible thickness. This conveyor extends diagonally across that path, is of the type known as edgewise, and, preferably, has driver studs or sprockets. Articles too thick to pass under the conveyor will be expelled from the main path by the studs.

According to a further development of the invention the main path is inclined transversely of the direction of conveyance. The articles passing through the clearance below said conveyor move toward a second lateral edgewise belt conveyor which is parallel to the main path and spaced from it to form a gap through which articles of certain smaller dimensions can fall onto a third conveying path.

The above-mentioned and other features and objects of the invention and the manner of attaining them will become more apparent and the invention itself will be best understood by reference to the following description of an embodiment of the invention taken in conjunction with the accompanying drawings in which:

FIG. 1 is an elevation of an arrangement as provided by the invention;

FIG. 2 is a plan view; and

FIG. 3 is an end view thereof.

Referring to FIG. 1, there is shown at the input end of the sorter a receptacle or hopper 1 for receiving articles to be sorted. Located within this receptacle is a horizontal conveyor 2 for moving articles within the hopper toward a chute 3. The outlet of chute 3 is adjacent one end of a main conveying path 5 so that articles from the chute arrive on path 5. The outlet end of chute 3 rests on a support 4 which maintains path 5 and chute 3 separated. As can be seen with the aid of FIG. 3, path 5 is tilted about its longitudinal axis and is vibrated by an agitating system 6. Agitating system 6 is located below the path 5 and the vibrating portion of the system contacts the lower side of path 5 causing it to vibrate. Conveying path 5 is surmounted by an edgewise belt conveyor 7 that extends diagonally across path 5. Conveyor 7 has spaced driver studs or sprockets 11 extending outwardly from one surface thereof. The conveyor 7 is spaced above path 5 at an angle to form a uniform clearance through which articles of varying sizes can pass, that is, belt conveyor 7 is mounted so that the lower edge of its belt is maintained a uniform distance above path 5 through its entire traverse of path 5. Along the lower edge of the inclined path 5 an edgewise belt conveyor 8 is provided and which conveyor may have studs or sprockets 8a similar to the stud 11. Conveyor 8 is spaced from path 5 to form a lateral gap through which articles of certain smaller dimensions can fall onto an additional conveying path 9, FIG. 3, by means of which they are transferred to a receptacle (not shown).

This arrangement operates as follows: The articles of random size are thrown into receptacle 1. By the conveyor 2 they are moved continuously toward chute 3 from which they fall onto the conveying path 5 constructed as a shaking table, where the sorting begins. All the flat articles pass through the clearance between path 5 and conveyor 7 due to the pull of gravity. Articles not flat, such as packages, mail, boxes and the like, are deflected by conveyor 7 from path 5 in order to be conducted to a further collecting receptacle (not shown). This is accomplished by conveyor 7 and studs 11 which contact the thick articles and convey them to one side of table 5 as the conveyor belt 7 traverses the face of table 5. Due to the slope of path 5 the articles flat enough to pass through below conveyor 7 move toward conveyor 8 and, according to their dimensions, either fall through the gap between path 5 and conveyor 8, or slide across slide 10′ into contact with conveyor 8 and are transferred by conveyor 8 to its collecting receptacle. The articles passing through the gap between path 5 and conveyor 8 fall onto the conveying path 9 and thence into a receptacle arranged to collect them.

The invention enables large quantities of mail articles to be sorted as to their sizes within a short time. Since articles of 220 x 115 millimeters are the greatest part of standard mail, the arrangement here disclosed will readily sort same preparatory to further treatment. The relatively small percentage of packages, boxes and over-size letters, will in most cases be separately and manually handled.

While I have described above the principles of my invention in connection with specific apparatus, it is to be clearly understood that this description is made by way of example and not as a limitation to the scope of my invention, as set forth in the objects thereof and in the accompanying claims.

What is claimed is:

1. A device for separating articles having predetermined dimensions from other articles having at least two dimensions larger than those predetermined comprising a hopper for holding said articles, a horizontal first belt conveyor disposed within said hopper, a chute arranged adjacent to the discharge end of said first belt conveyor to direct said articles in a given path, and a planar table adjacent the discharge end of said chute to receive said articles, said table being titled from the horizontal around its longitudinal axis to form said path for said articles, agitating means operatively connected to vibrate said planar table and position said articles thereon, whereby said articles are urged across said table by the attraction of gravity and are therefore conveyed obliquely downward in the direction of the tilt of said table, an edgewise second belt conveyor mounted a predetermined distance above said tilted table and parallel to the surface of said table and extending diagonally across said table whereby articles moving along said table which have a vertical dimension greater than the distance between said table and said second belt conveyor are intercepted by the lower edge of said second belt conveyor and diverted by movement thereof in a second diagonal path across said table away from the remaining articles which continue to pass downward between said table and second belt conveyor, a third belt conveyor spaced apart from said planar table so as to form a slot between said table and said third belt conveyor, a fourth belt conveyor disposed below said third belt conveyor whereby said remaining articles having the dimension larger than the width of said slot pass across said slot and into engagement with said third belt conveyor and are expelled, and articles having a dimension smaller than the width of said slot pass through said slot and are expelled by said fourth belt conveyor.

2. A device for separating articles having predetermined dimensions from other articles having their dimensions larger than those predetermined, comprising a hopper for holding said articles, a horizontal first belt conveyor disposed within said hopper, a chute arranged adjacent to the discharge end of said first belt conveyor, a planar table disposed adjacent the discharge end of said chute and tilted from the horizontal around its longitudinal axis to form a path for said articles, agitating means operatively connected to vibrate said tilted table and position and articles thereon, whereby said articles are urged across said table by the attraction of gravity and are therefore conveyed obliquely downward in the direction of tilt of said table, an edgewise second belt conveyor mounted a predetermined distance above said tilted table and parallel to the surface of said table and extending diagonally across said table whereby articles moving along said table which have a vertical dimension greater than the distance between said table and said second belt conveyor are intercepted by the lower edge of said second belt conveyor and diverted by movement thereof in a second diagonal path across said table with the remaining said articles passing between said table and second conveyor, a third belt conveyor spaced apart from said tilted table and forming a slot between said belt conveyor and said table, a fourth belt conveyor disposed below said third conveyor, slides mounted at predetermined intervals across the slot between said third belt conveyor and said tilted table, whereby articles having a horizontal dimension less than the width of said slot and less than said predetermined intervals between said slides fall through said slot between said slides and are expelled by said fourth conveyor, while articles having a horizontal dimension greater than the width of the slot and the predetermined intervals of said slides pass over said slot and said slides and are expelled by said third belt conveyor.

3. A device for separating flat surfaced articles having predetermined dimensions from other articles having at least one dimension larger than those predetermined comprising holding and feeding means to direct said articles in a given path; conveying and agitating means to position and move all said flat articles in a common plane along said path so that their shortest dimension is essentially vertical; means in said path for intercepting said articles having said vertical dimension greater than predetermined and permitting passage of said articles having said vertical dimension smaller than predetermined, and for diverting said intercepted articles into a second path.

4. A device is in claim 3 wherein said conveying and agitating means includes a planar table disposed at the bottom of said holding and feeding means and tilted from the horizontal around its longitudinal axis, and said agitating means being operatively connected to vibrate said table and cause said articles placed on said table to move across said table by the attraction of gravity and to be conveyed obliquely downward in the direction of tilt of said table.

5. A device for separating flat surfaced articles having predetermined dimensions from other articles having at least one dimension larger than those predetermined comprising holding and feeding means to direct said articles in a given path, said holding and feeding means including a hopper, a horizontal first belt conveyor disposed within said hopper, and a chute arranged adjacent the discharge end of said first belt conveyor; conveying and agitating means to position and move all said flat articles in a common plane along said path so that their shortest dimension is essentially vertical, said conveying and agitating means including a planar table disposed at the bottom of said chute and tilted from the horizontal around its longitudinal axis, and agitating means operatively connected to vibrate said table and cause said articles placed on said table to move across said table by the attraction of gravity and to be conveyed obliquely downward in the direction of tilt of said table; means in said path for intercepting said articles having said vertical dimension greater than predetermined and permitting passage of said articles having said vertical dimension smaller than predetermined, said intercepting means comprising an edgewise second belt conveyor mounted at a predetermined distance above said tilted table and parallel to the surface of said table and extending diagonally across said table, whereby articles moving along said table which have a vertical dimension greater than the distance between said table and said second belt conveyor are intercepted by the lower edge of said second belt conveyor and said smaller dimension articles pass between said second belt conveyor and said parallel table surface; and means for diverting said intercepted articles into a second path.

References Cited in the file of this patent

UNITED STATES PATENTS

| | | |
|---|---|---|
| 425,705 | Smallwood | Apr. 15, 1890 |
| 660,611 | Zehnder et al. | Oct. 30, 1900 |
| 764,919 | Crum | July 12, 1904 |
| 1,292,820 | Lindsley | Jan. 28, 1919 |
| 1,582,820 | Hungerford | Apr. 27, 1926 |
| 2,186,652 | Orth et al. | Jan. 9, 1940 |
| 2,446,320 | Andrews | Aug. 3, 1948 |
| 2,701,638 | Petro | Feb. 8, 1955 |
| 2,821,301 | Montague | Jan. 28, 1958 |

FOREIGN PATENTS

| | | |
|---|---|---|
| 21,977 of 1913 | Great Britain | July 16, 1914 |
| 805,542 | France | Aug. 22, 1936 |